United States Patent Office 3,330,806
Patented July 11, 1967

3,330,806
CROSSLINKABLE POLYPHENYLENE ETHERS
Willem F. H. Borman, Dalton, Mass., assignor to General Electric Company, a corporation of New York
No Drawing. Filed June 10, 1964, Ser. No. 374,139
13 Claims. (Cl. 260—47)

ABSTRACT OF THE DISCLOSURE

A polyphenylene ether with a plurality of repeating units having a hydroxyl group attached to a position ortho to the oxygen ether atom. The hydroxyl group renders the polymer crosslinkable by activating the aromatic nucleus in position meta to the oxygen ether atom or by acting as a crosslinking site. Also, a process for forming hydroxy substituted polyphenylene ethers by etherification of the monomer prior to oxidative coupling and subsequent hydrolysis of the polymer.

---

This invention relates to modified polyphenylene ethers. More particularly, it relates to such ethers where a different type of polymer unit which is capable of supporting cross-linking is incorporated in the polymer chain.

As they are thermoplastic, polyphenylene ether resins, particularly the 2,6-disubstituted ether resins, have a number of outstanding physical and chemical properties. In particular, polyphenylene ether resins combine high tensile strength and tensile modulus with a high softening temperature, outstanding electrical insulating properties, and excellent resistance against water, steam, strong acids and alkalies.

However, the polyphenylene ether resins also have a number of undesirable characteristics, such as those common to most thermoplastic materials. Their resistance to most common organic solvents is low. Aromatic and chlorinated hydrocarbon solvents dissolve phenylene oxide polymers, while other solvents and solvent vapors induce crazing in molded polyphenlyene ether parts under stress, thus causing an almost complete loss of strength. The tensile properties of the resins decrease steadily with increasing temperature, and drop off sharply at about 200° C. Further, under prolonged stress, molded parts of polyphenylene ether tend to creep, causing permanent deformation.

It has been known that these disadvantages may be overcome by cross-linking the individual polymer molecules during, or after, the forming of the material into its final shape. Thus, if a sufficient number of cross-linking sites are present, the material can be cross-linked and will then no longer be soluble, but only swell, to a greater or lesser extent.

The phenomenon of solvent crazing is not fully understood as yet but appears to involve crystallization of the polymer molecules. As the mobility of the polymer molecule is limited by cross-linking, crystallization is no longer possible, and thus the problem of solvent crazing is removed. The limitation on molecular mobility also prevents the polymer from flowing, even above its melting point, thus preventing, to a large degree, creep and loss of tensile properties at increased temperatures.

Polyphenylene ethers are, to a high degree, chemically inert, a desirable characteristic from a material standpoint. However, because of this inertness the prior art has experienced difficulty in introducing cross-links between the chains, and structurally different units generally, by simple chemical processes. For example, prolonged heating in air will render the polymer insoluble in aromatic or chlorinated hydrocarbon solvents, but the degree of cross-linking accomplished is quite low, and the materials produced swell to a considarble degree. Further, the prolonged heating causes the materials to degrade and become quite brittle. One very attractive method of cross-linking polyphenylene ether resins, and one used extensively in the field of phenolic resins, is by condensation through aliphatic aldehydes, especially formaldehyde which may be derived from an aldehyde precursor such as hexamethylenetetramine, among other compounds. However, such a reaction requires activation of the aromatic ring, preferably by a hydroxyl substitutent. Because no hydroxyl radical is present in standard polyphenylene ether resins, no appreciable cross-linking is achieved when these materials are heated in a mold in the presence of hexamethylenetetramine.

In accordance with this invention a facile method of introducing hydroxyl radicals into the polyphenylene ether resin has been found, thus providing a polymer which is easily cross-linked or otherwise reacted. If a chemical unit having hydroxyl radicals, or substituents which may easily be converted to hydroxyl radicals, is introduced into the polyphenylene ether resin chain, the possibility of cross-linking through methylene bridges formed by an aldehyde condensation becomes feasible. Additionally, when such hydroxyl radicals are present, other methods of cross-linking and reaction are possible.

It is, therefore, one object of this invention to produce a polyphenylene ether resin containing units which may be converted to phenyl groups having hydroxyl substituents.

It is a further object of this invention to produce polyphenylene ether resins containing phenyl groups which are substituted with hydroxyl radicals.

Another object of this invention is to provide polyphenylene ether resins which may be cross-linked by known methods.

It is a still further object of this invention to provide a method for producing cross-linked polyphenylene ether resins.

Briefly, this invention involves the use of substituted phenols, which have an ether substituent in the 2-position, either alone, or in combination with other substituted and unsubstituted phenols, in the formation of polyphenylene ether resin chains. By a subsequent hydrolysis, the ether group is removed and a hydroxyl substituent formed on the phenyl group. The resultant phenyl group may then be reacted with a formaldehyde releasing substance, such as hexamethylenetetramine, to cross-link the polymer, or the hydroxyl group may be itself involved in a reaction to cross-link the polymer or to link other types of chemical structures to the polyphenylene ether resin chain.

The polymerization of substituted phenols to high molecular weight polymers in the presence of oxygen and copperamine complexes is disclosed in co-pending patent applications of Alan S. Hay, Ser. Nos. 212,127 and 212,128, filed concurrently on July 24, 1962 and incorporated herein by reference. The substituted phenols which may be polymerized by this method may be represented by the formula

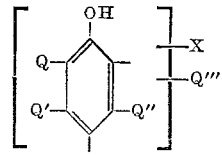

where X is a substituent selected from the group consisting of hydrogen, chlorine, bromine, and iodine; Q is a monovalent substituent selected from the group consisting of hydrogen, hydrocarbon radicals, hydrocarbonoxy radicals free of a tertiary-carbon atom, and halohydrocarbon radicals having at least α-carbon atoms between the halogen atom and phenol nucleus and being free of a tertiary α-carbon atom; and Q', Q" and Q'" are the same as Q and in addition, halogen, hydrocarbonoxy radicals free of a tertiary α-carbon atom, and halohydrocarbonoxy radicals having at least two carbon atoms between the halogen atom and phenol nucleus and being free of a teritary α-carbon atom.

As noted above, the catalyst used to polymerize the substituted phenols is a copper amine complex. The copper salt used to form the complex may be either a cuprous or cupric salt. The only requirement is that, if a cuprous salt is used, it must be capable of existing in the cupric state and must form a complex that is soluble in the reaction medium.

Typical examples of copper salts suitable for forming the complex are cuprous chloride, cupric chloride, suprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, etc. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc. are not suitable, since they either do not form soluble complexes with the amines, or are not capable of existing as stable cupric salts. For example, cupric cyanide and cupric thiocyanate autogeneously decompose to a corresponding cuprous salt. Cuprous nitrate and cuprous chloride are not known to exist but the amine complexes can be made in situ. Substitution of cupric chloride, cupric sulfate, cupric perchlorate, and cupric nitrate for the cuprous salts without first converting them to the corresponding basic cupric salt, does not catalyze the oxidation of the substituted phenols to polyphenylene ethers.

The amine useful for forming the complex catalyst with the copper salt may be a primary, secondary or tertiary amine free of aryl substituents directly bonded to the amine nitrogen. Typical examples of suitable amines are the aliphatic amines, including cycloaliphatic amines wherein the cycloaliphatic group is substituted on the amine nitrogen, for example, mono-, di-, and trimethylamine,
mono-, di-, and triethylamine,
mono-, di-, and tripropylamine,
mono-, di-, and tributylamine,
mono-, di-, and trisecondary propylamine,
mono-, di-, and tribenzoamine,
mono-, di-, and tricyclohexylamine,
mono-, di-, and triethanolamine,
ethylmethylamine,
methylpropylamine,
allylethylamine,
methylcyclohexylamine,
morpholine,
methyl-n-butylamine,
ethylisopropylamine,
benzylmethylamine,
octylbenzilamine,
octylchlorobenzylamine,
methylcyclohexylamine,
methylphenethylamine,
benzylethylamine,
di(chlorophenethyl)amine,
1-methylamino-2-phenylpropane,
1-methylamino-4-pentene,
N-methyldiethylamine.
N-propyldimethylamine,
N-allyldiethylamine,
3-chloro-N,N'-dimethylpropylamine,
N-butyldimethylamine,
N-isopropyldiethylamine,
N-benzyldimethylamine,
N-benzyldioctylamine,
N-chlorobenzyldioctylamine,
N-cyclohexyldimethylamine,
N-phenethyldimethylamine,
N-benzyl-N-methylethylamine,
N-bromobenzyl di(chlorophenethyl)amine,
N,N-dimethyl-2-phenylpropylamine,
N-dimethyl-4-pentenylamine,
N,N-diethyl-2-methylbutyl amine, etc.

When aliphatic amines are used, I prefer that the aliphatic groups be straight chain hydrocarbon groups.

Examples of cyclic amines are the pyridines, such as pyridine itself, α-, β-, and γ-collidine, α-, β-, and γ-picoline, and 2,4-, 2,5-, 2,6- and 3,4-lutidine, quinuclidine, the dipyridyls, the pyrroles, the pyrrolidines, the piperidines, the diazoles, the triazoles, the diazines, the triazines, the quinolines, the diquinoyls, the isoquinolines, the tetrahydroquinolines, the tetrahydroisoquinolines, the phenanthrolines, the morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, vinoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that secondary cyclic amines, e.g., piperidines, pyrroles, pyrrolidines, tetrahydroquinolines, tetrahydroisoquinolines may also be used in the form of tertiary amines whereby an alkyl hydrocarbon radical, such as those listed above for the ring substituents, is attached to the amine nitrogen group, e.g., N-methylpyrrole,
N-methyl tetrahydroquinoline,
N-methyl tetrahydroisoquinoline,
N-methyl piperidine,
N-methyl pyrrolidine,
N-methylimidazole,
N-methyl-1,2,4-triazole,
N-decylpiperidine,
N-decylpyrrolidine,
N-isobutylpiperidine,
1-decyl-2-methylpiperidine,
N-isopropylpyrrolidine,
N-cyclohexylpiperidine, etc.

In general, primary, secondary, tertiary, mixed primary-secondary, mixed primary-tertiary or mixed secondary-tertiary polyamines would behave in the same way as primary, secondary and tertiary monoamines in my reaction, except of course, the amount used would only have to be that amount necessary to give the equivalent amount of amino groups. I may use polyamines wherein two or more amine groups, of the kind listed above for the monoamines, are attached to an aliphatic or cycloaliphatic nucleus, e.g., ethylene, diethyleneamine, propylene, butylene, pentylene, hexylene, cyclopentylene, cyclohexylene, etc. Typical examples of these aliphatic polyamines are the
N,N-dialkylethylenediamines,
N,N,N'-trialkylethylenediamine,
propanediamine,
ethylenediamine,
the N-alkylethylenediamines,
the N-alkylpropanediamines,
the N,N'-dialkylpropanediamines,
the N,N,N'-trialkylpropanediamines,
propanediamine,
the N-alkylpropanediamines,
the N,N'-dialkylbutanediamines,
pentanediamine,
the N-alkylpentanediamines,
the N,N'-dialkylpentanediamines,
the N,N,N'-trialkylpentanedianes,
diethylenetriamine,
the N-alkyldiethylenetriamines,
the N'-alkyldiethylenetriamines,
the N,N',N''-trialkyldiethylenetriamines,
the N,N',N''-trialkyldiethylenetriamines,
the N,N,N'-trialkyldiethylenetriamines,
the N,N',N,N''-tetraalkyldiethylenetriamines,
the N',N',N'',N''-tetraalkyldiethylenetriamines,
the cyclohexylenediamines, etc.

Likewise, the polyamines may be mixed aliphatic and cyclic amines, e.g., aminoalkylpyridines, alkylaminoalkyl-pyridines, etc. I have, however, discovered that those polyamines which have only two or three aliphatic or cyclo-aliphatic carbon atoms separating the two primary or secondary amino nitrogens represent a class of polyamines which are strong chelating agents and form complexes with the copper salt which so completely envelope the copper that the complex is less reactive than the other aliphatic primary or secondary amines in the oxidation reaction. Because of this, I prefer, when using primary or secondary amines, to use primary and secondary monoamines. However, this is not true of tertiary polyamines. Typical examples of such tertiary amines are:

N,N,N',N'-tetramethylethylenediamine,
N,N,N',N'-tetraethylethylenediamine,
N,N,N',N'-tetrapropylethylenediamine,
N,N,N',N'-tetrabutylethylenediamine,
N-butyl-N-octyl-N',N'-dimethylethylenediamine,
N¹,N¹-dibenzyl-N²,N²-dimethyl-1,2-propanediamine,
2-chloro-N,N,N',N'-tetraethyl-1,3-propanediamine,
N'-(3-chloro-p-tolyl)-N,N-diethyl-N'-methyl-1,3,2-(β-dimethylaminoethyl)pyridine,
N,N,N',N'-tetrabenzyl-3-butene-1,2-diamine,
N,N,N',N'-tetramethyl-2-butyne-1,4-diamine,
N,N,N',N'-tetraallylputrescine,
N,N,N',N'-tetramethyl-1,4-diphenylputrescine,
N,N,N',N'-tetraisopropyl-1,3-butanediamine,
N,N,N',N'-tetramethyl-1,3-cyclopentanediamine,
N,N,N',N'-tetramethyl-1,4-cyclohexanediamine, etc.,
N-ethyl-N,N',N'-trimethylethylenediamine,
N-methyl-N,N',N'-triethylethylenediamine,
N,N,N',N'-tetramethyl-1,3-propanediamine,
N,N-dimethyl-N',N'-diethylethylenediamine,
1,2-bis(2-methylpiperidino)ethane,
N,N,N',N'-tetra-n-hexylethylenediamine,
N,N,N',N'-tetra-n-amylethylenediamine,
1,2-bispiperidinoethane,
N,N,N',N'-tetraisobutylethylenediamine,
N,N,N',N'-tetramethyl-1,3-butanediamine,
N,N,N',N'-tetramethyl-1,2-cyclohexanediamine,
1,2-bis(2,6-dimethylpiperidino)ethane,
N,N-didecyl-N',N'-dimethylethylenediamine,
N-methyl-N',N',N'',N''-tetraethyldiethylenetriamine,
N-decyl-N,N'-triethylethylenediamine,
2-(b-piperidinoethyl)-pyridine,
2-(b-dimethylaminoethyl)-6-methylpyridine,
2-(b-dimethylaminoethyl)pyridine,
2-(b-morpholinoethyl)-pyridine, etc.

The substituted phenols that may be polymerized using oxygen and a copper-amine complex include phenols having ether substituents such as those represented by the following structures.

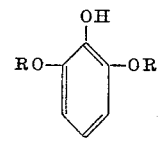

(1)

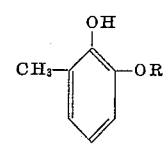

(2)

where R is alkyl, aryl, substituted aryl, acetyl, propionyl, etc. These materials have been either homopolymerized, or copolymerized with other substituted phenols, including those having no ether substituent.

However, the ether substituted phenols shown above do not easily and completely hydrolyze following polymerization so that the formation of a polyphenylene ether polymer having reactive sites has not been possible prior to this invention. In accordance with this invention, it has been found that a specific group of ether substituted phenols may be reacted in a ratio of from 1 to 100 mol percent with from 99 to 0 mol percent of other substituted and unsubstituted phenols, to yield a polyphenylene ether resin having reactive sites along the chain. Those ethers which, according to the present invention, have been found particularly suitable are those having an acetal type of structure.

Phenols capable of providing reactive sites in a polyphenylene ether may be represented as follows:

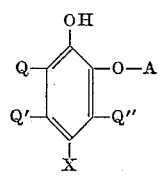

(3)

where Q, Q', and Q'' are as defined above and A is a member selected from the group consisting of single ringed heterocyclic compounds containing either an oxygen atom or sulfur atom in a position α to the phenolic ether oxygen and

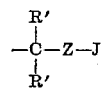

(4)

where Z is either an oxygen or sulfur atom; J is selected from the group consisting of monovalent hydrocarbon substituents and substituted monovalent hydrocarbon substituents, such as alkyl radicals, and R' is the same as J, and in addition hydrogen.

Preferably, the substituents designated Q', Q'', and X are hydrogen. Thus, the preferred structure for the phenolic ethers is

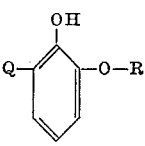

(5)

where Q and A are as previously defined.

Typical examples of the monovalent hydrocarbon radicals that Q can represent are alkyl, including cycloalkyl, such as methyl, ethyl, propyl, isopropyl, butyl, secondary butyl, isobutyl, cyclobutyl, amyl, cyclopentyl, hexyl, cyclohexyl, methylcyclohexyl, ethylcyclohexyl, octyl, decyl, octodecyl, etc. The monovalent halohydrocarbon radicals may be the same as the hydrocarbon radicals, as described above, except methyl and α-haloalkyl radicals, wherein one or more of the hydrogen atoms are replaced by halogen to produce halohydrocarbon radicals having at least two carbon atoms between the halogen and free valence, examples of which are: 2-chloroethyl, 2-bromoethyl, 2-fluoroethyl, 2,2-dichloroethyl, 2- and 3-bromopropyl, 2,2-difluoro-3-iodopropyl, 2-, 3-, and 4-bromobutyl, 2-, 3-, 4-, and 5-fluoroamyl, iodophenylethyl, phenylchloroethyl, bromotolylethyl, etc.

Additionally, Q' and Q" may represent monovalent hydrocarbon radicals such as aryl, including alkaryl, such as phenyl, tolyl, ethylphenyl, xylyl, naphthyl, methylnaphthyl, etc.; and halohydrocarbon radicals such as mono-, di-, tri-, tetra-, and penta-chlorophenyl, mono-, di-, tri-, and tetrabromotolyl, chloroethylphenyl, ethylchlorophenyl, fluoroxylyl, chloro-naphthyl, bromobenzyl.

Typical examples of the monovalent type of hydrocarbonoxy radicals are: methoxy, ethoxy, propoxy, isopropoxy, butoxy, secondary butoxy, hexoxy, octoxy, decoxy, butanoxy, phenyloxy, toloxy, ethylphenoxy, naphthoxy, methylmethoxy, benzoxy, phenylethoxy, phenylpropoxy, tolyloxy, etc. The monovalent halohydrocarbonoxy radicals may be the same as the above oxyhydrocarbons, except methoxy and α-haloalkoxy radicals, where one or more of the hydrogens are replaced by halogen, i.e., fluorine chlorine, bromine, or iodine, to produce halohydrocarbonoxy radicals having at least two carbon atoms between the halogen and the free valence, a few typical examples of which are: chloroethoxy, 2-bromoethoxy, 2-fluoroethoxy, 2,2-dichloroethoxy, 2- and 3-bromopropoxy, 2,2-difluoro-3-chloropropoxy, 2-, 3-, and 4-iodobutoxy, 2-, 3-, 4- and 5-fluoroamoxy, 2-chlorobenzoxy, mono-, di-, tri-, tetra-, and penta-chlorophenoxy, mono-, di-, tri-, and tetratoloxy, fluoroethylphenoxy, ethylchlorophenoxy, iodoxyloxy, chloronaphthoxy, bromobenzoxy, chlorophenylethoxy, phenylchloroethoxy, bromotolyloxy, etc.

Included among the possible substituents for R' and J are alkyl radicals such as methyl, ethyl, propyl, isopropyl, etc.; cycloalkyl radicals such as cyclopentyl, cyclohexyl, etc.; aryl radicals such as phenyl, naphthyl, biphenyl, etc.; and aralkyl radicals such as tolyl, xylyl, ethylphenyl, etc.

Among the single-ringed heterocyclic compounds represented by A in Formula 3 are those having oxygen atoms such as furan, pyran, dioxane, etc.; rings containing sulfur atoms such as thiophene, etc.; and those containing more than one member of the group defined above as Z, such as oxathiole. The only requirement is that at least one of the heterocyclic oxygen or sulfur atoms be adjacent to the carbon atom which is bonded to the ether linkage to the phenol group.

Included among the noncyclic compounds which may be included in the Formula 4 are methylal

[—CH(OCH$_3$)$_2$]

ethylal [—CH(OCH$_2$H$_5$)$_2$] 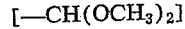 and other acetals and thioacetals meeting the formula

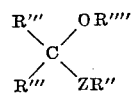 (6)

where Z is as defined above, R" is a monovalent, aliphatic hydrocarbon radical having less than 12 carbon atoms, R''' is selected from the group consisting of hydrogen and aliphatic and aromatic hydrocarbon radicals, and R'''' is the

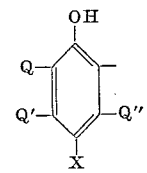

group, where X, Q, Q', and Q" are defined above.

Following polymerization, the etheric compounds will form units having the formula

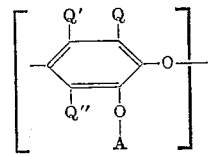 (7)

where Q, Q', Q" and A are as previously defined.

Following polymerization, the etheric compounds of the preferred structure will form units having the formula

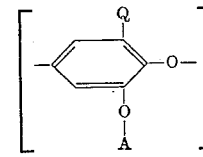 (8)

where Q and A are as previously defined.

While any of the groups represented by A may be easily and completely removed from the phenol group by a hydrolysis reaction following polymerization, the pyranol group is preferred. The phenol compound with the pyranol ether group, which may be either homopolymerized or copolymerized with other substituted and unsubstituted phenols, may be represented by the formula

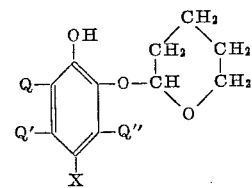 (9)

where X, Q, Q', and Q" are as previously defined. There are two reasons for the preference for the pyranol group: (1) the pyranol ether is easily prepared, and (2) the pyranol ether group is particularly easily removed by hydrolysis following polymerization.

The purpose of the group having the acetal structure on the ether linkage is the prevention of the oxidation of the phenol monomers to quinones and tar-like materials during the process of the oxidative polymerization. It has unexpectedly been found that the polymerization rate of these etheric phenols appear to be comparable to that of phenols, such as 2,6-dimethylphenol, either by themselves or in combination with the 2,6-dimethylphenol and other substituted and unsubstituted phenols. Past experience had shown that phenols polymerize most rapidly when small, normal alkyl groups are the substituents in the 2 and 6 positions of the polymer. Thus, 2,6-dimethylphenol has been the preferred monomer for the preparation of the prior art polyphenylene ethers. It would be expected that a bulky ether group, such as the pyranol group, in the 2-position, would at least sterically interfere with the polymerization process. This, however, has not been found to be the case.

As an example, of the ethers which may be utilized in the present invention, the preparation of 3-methylcatechol-1-pyranol ether is described. This product is the same as Formula 9 where X, Q′, and Q″ are hydrogen, and Q is methyl. It should be noted, that while the pyranol group is the preferred substitutent, it is here representative only of various groups which are utilizable in the present invention by forming an acetal type of linkage. The product may be prepared by mixing 3-methylcatechol with a slight excess of dihydropyran in the presence of the trace of acid. The reaction may be represented as follows:

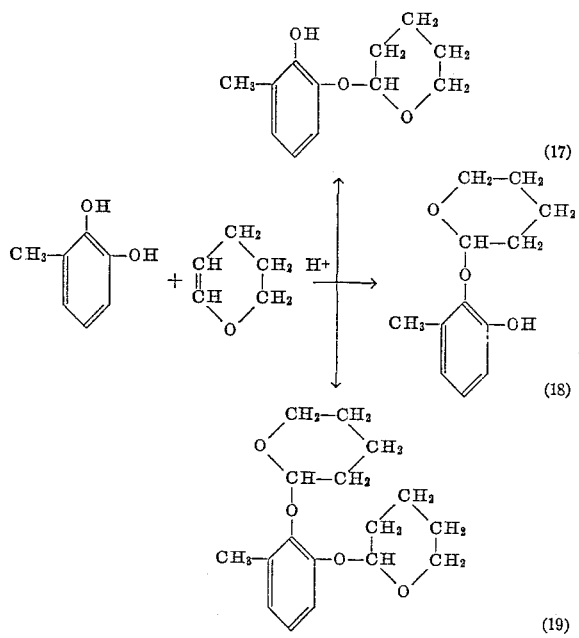

The acid catalyst is neutralized with a weak alkali, such as sodium bicarbonate, and the reaction mixture is fractionally distilled.

As an alternate procedure for the preparation of 3-methylcatechol-1-pyranol ether, the reaction medium may be treated with 10% aqueous sodium hydroxide to extract the ether (17) along with the unreacted 3-methylcatechol and the 3-methylcatechol-2-pyranol ether (18). This extract is neutralized with carbon dioxide which precipitates the two pyranol ethers, and the ethers may subsequently be a re-extracted with a suitable organic solvent, such as benzene. A vacuum distillation yields a mixture of pure ethers, from which the desired 1-pyranol ether (17) crystallizes upon standing. The 1-pyranol ether is further purified by recrystallization from petroleum ether.

The pure 3-methylcatechol-1-pyranol ether melts at from 53–55° C., and readily and cleanly polymerizes with oxygen, in the presence of a copper-amine catalyst, to a high molecular weight polymer. By comparison, the 2-pyranol ether, under the same conditions, yields only a tar. The copperamine complex catalyst is described in more detail in the aforementioned Hay application.

The etheric phenol, as mentioned, may be either homopolymerized or copolymerized with other substituted and unsubstituted phenols by the standard oxidative polymerization. Following polymerization, the polymer is treated with aqueous acid which rapidly and completely removes the ether groups, thus forming hydroxyl radicals on the aryl nucleus. The homopolymers of the etheric phenols are soluble in both methanol and aqueous alkali, while their copolymers with the other phenols have properties intermediate between the etheric homopolymer and the polyphenylene ether formed without the etheric phenol, depending upon the ratio of materials present in the copolymer.

The formula for the etheric phenols used in the present invention may vary somewhat, depending upon the use to which the final polymer is to be put. However, when the final polymer is to be cross-linked utilizing methylene bridges derived from various formaldehyde releasing compounds, a reactive site, other than the hydroxyl radical and X, must be available on the aryl nucleus. As the hydroxyl group formed from the ether group is orthopara directing in its activity, the site which must be available is a position 2- or 4- relative to it, thus, the positions designated in the above molecules as Q′ and Q″. Therefore, when the final polymer is to be cross-linked by methylene bridges, at least one of the positions designated by Q′ and Q″ must be unsubstituted, that is, it must be a hydrogen atom. Where both are hydrogen this is the equivalent of the preferred Formula 5. On the other hand, when the hydroxyl group is to be used to join other substituents to the polymer backbone directly, that is, by reaction with the hydroxyl group, both the positions designated by Q′ and Q″ may be substituted, as desired.

Following polymerization, the polymer is hydrolyzed to remove the etheric group and replace it with a hydroxyl group. The hydrolysis is conducted in an acid medium having an acid strength greater than 0.1%. Any of the strong mineral acids, such as the hydrogen halides, nitric acid, or sulfuric acid, may be utilized. Any solvent in which the polyphenylene oxide is soluble may be utilized to conduct the hydrolysis reaction. Among these solvents are aromatic and/or chlorinated hydrocarbons, such as benzene, toluene, chlorobenzene, chloroform, tetrachloroethylene, etc. However, a water miscible solvent, such as tetrahydrofuran pyridine, or 1,4-dioxane, is preferred in that the reaction may be carried out more smoothly. The polymer should be present in the solvent in a range from about 1 to 20%. The amount of water which need be present is only that stoichiometrically required for reaction. However, a preferred range is 5–20% in the organic solvent.

The hydrolysis should be conducted at from room temperature to about 100° C., the boiling point of water. A preferred temperature is in the range of 50° C. At 50° C., with an acid concentration of about 1% in a 10% solid solution, and with 10% water, the reaction will take about 15 to 20 minutes. However, the time of reaction can vary considerably, depending upon the particular acid used, the particular etheric group to be hydrolyzed, the reaction temperature, the concentration of the acid, the amount of water present, and the concentration of the polymer solvent solution.

Following hydrolysis the final unit has the formula

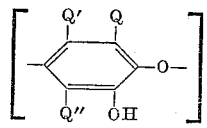

(20)

As has been noted previously, several of the substituents designated as Q, Q′, and Q″ are ether groups themselves, but none have the acetal structure. However, as they are ether groups, they will, of course, hydrolyze, at least to some extent, in the acid medium and under the conditions of reaction utilized. Normally, the hydrolysis of the other ether groups is not complete. However, as there is some hydrolysis, if an exact percentage of hydroxyl groups is desired or required, the substituents designated by Q, Q′, and Q″ must be limited to non-hydrolyzable substituents, that is, non-ether substituents. This is also true of the Q‴ substituent in the non-etheric phenol.

The polymers to which this invention relate either the homopolymers of the etheric phenol, or the copolymers with other phenols, range from low molecular weight polymers having from 10 to 15 units to high molecular weight polymers which have from 100 to 1500 or more units. This last range of polymers has film and fiber forming properties and is the preferred molecular weight.

For purposes of illustration, the following examples show the preparation of homopolymers and copolymers of 3-methylcatechol-1-pyranol ether (17), and results obtained with these products. The examples are included for purposes of illustration only, and should not be considered as limiting in any way the full scope of this invention as covered in the appended claims.

The following are examples of the preparation of 3-methylcatechol-1-pyranol ether and of the homopolymerization and copolymerization of this product.

EXAMPLE 1

*Preparation of 3-methylcatechol-1-pyranol ether*

A solution was prepared comprising 400 ml. hot benzene, 250 gm. 3-methylcatechol, and 50 gm. of dihydropyran to increase the solubility of the catechol. The solution was cooled to 20° C. in an ice bath and 0.5 ml. of 38% aqueous hydrochloric acid was added to initiate the reaction. The temperature rose to 37° C. and then decreased to 10° C. An additional 150 gm. dihydropyran, diluted with 100 ml. benzene, was added slowly with continuous stirring while maintaining the temperature below 12° C. Following this addition another 0.5 ml. aqueous hydrochloric acid was added and the mixture was left overnight at room temperature. At this point the solution was extracted several times in a separatory funnel, utilizing a total of 1000 ml. of 10% aqueous sodium hydroxide. The extract was separated and saturated with Dry Ice, re-extracted with 1 liter of benzene, and the benzene solution dried over anhydrous sodium sulfate. The solution was then filtered, the solvent distilled off, and the residue fractionated in a vacuum, the fraction boiling between 115 and 117° C. at 0.6 mm. Hg being collected. This fraction, weighing 273 gm., contained the two isomeric pyranol ethers. The fraction was recrystallized twice from petroleum ether having a boiling range of 38 to 53° C., yielding 116 gm. of white crystals which melted at 53 to 55° C. Additional yield was obtained by recrystallizing the fore and after runs of the distillation in the mother liquors of the original crystallization. This additional yield amounted to 30 gm. of crystalline product, thus giving a total yield of 146 gm. or 35% of the theoretical yield based on the 3-methylcatechol.

While the residue of an evaporation of the mother liquor had an infrared spectrum showing two strong OH absorptions, indicating a mixture of the two isomeric pyranol ethers, the crystalline material showed only the one strong OH absorption at the lower frequency, indicating steric hindrance by the CH₃— and pyranol ether groups adjoining the —OH group. This steric hindrance would be expected for the 1-pyranol ether. The shape of the C=C doublet at 6.3 microns also tended to confirm the hindered phenolic OH in the crystalline material.

EXAMPLE 2

*Homopolymerization of 3-methylcatechol-1-pyranol ether*

A solution was prepared containing 5 gm. of 3-methylcatechol-1-pyranol ether in 50 ml. toluene. The solution was placed in a 500 ml. 3-neck flask equipped with stirrer, thermometer, and oxygen inlet tube. A catalyst, comprising 0.5 gm. N,N,N',N'-tetramethyl-1,3-butane diamine and 0.15 gm. cuprous bromide dispersed in 50 ml. of toluene, was added, followed by 5 gm. of anhydrous magnesium sulfate. While the mixture was stirred vigorously, oxygen was passed through it for 30 minutes. The temperature, initially 19.5° C., rose rapidly to 27.5° C., and then started to drop. For the remainder of the reaction period, about 90 minutes, the temperature was maintained at 30° C. using an external water bath.

The reaction mixture was added to 1 liter of methanol and the precipitate, containing the homopolymer, was filtered off and redissolved in 200 ml. of toluene. Magnesium sulfate was filtered off of this solution and the remaining polymer reprecipitated in 1 liter of methanol. The precipitated polymer was filtered from the solution and suspended in 1,4-dioxane containing 10% water. About 1 ml. of 38% aqueous hydrochloric acid was added and the dispersion was stirred until a clean solution was obtained. This solution was added to a tenfold excess of water, and the gelatinous precipitate which formed was filtered off. The precipitate was dried in air for 3 days, and then overnight in a vacuum desiccator over concentrated sulfuric acid. The yield of the homopolymer was 1.7 gm. of a material having an intrinsic viscosity in dioxane at 30° C. of 26.8 ml./g.

The following examples show the production of copolymers which include 3-methylcatechol as one of the units.

EXAMPLE 3

A solution was prepared containing 12 gm. 2,6-dimethylphenol (0.1 mol.) and 21 gm. 3-methylcatechol-1-pyranol ether (0.1 mol.) in 250 ml. of toluene. A catalyst, comprising 0.6 gm. cuprous bromide, 3.5 gm. diethylamine, and 15 gm. of anhydrous magnesium sulfate, was added and oxygen was passed through the stirred solution for a period of one hour, during which time the temperature was maintained at 30° C. The resulting reaction mixture was filtered, and the filtrate added to 1 liter of methanol. The precipitate from this step was filtered off, washed with methanol on the filter, and then heated for 2 hours at 50–60° C. in 500 ml. of 20% aqueous methanol which contained 10 ml. of 38% aqueous hydrochloric acid. The solids were filtered off, washed with 100 ml. 20% aqueous methanol and dried in a vacuum at 80° C. The final product weighed 21.5 gm. and had an intrinsic viscosity in chloroform at 30° C. of 30 ml./g. The copolymer contained 50 mol percent catechol units.

EXAMPLE 4

The reaction of Example 3 was repeated using 19.2 gm. of 2,6-dimethylphenol (0.16 mol.) and 8.4 gm. 3-methylcatechol-1-pyranol ether (0.04 mol.). The yield from this reaction was 21 gm. of a material having an intrinsic viscosity in chloroform at 30° C. of 35 ml./g. The mol percentage of 3-methylcatechol in this polymer was 20%.

EXAMPLE 5

The reaction of Example 3 was again repeated, this time using 21.6 gm. of 2,6-dimethylphenol (0.18 mol.) and 4.2 gm. of 3-methylcatechol-1-pyranol ether (0.02 mol.). The yield in this case was 23.5 gm. of a copolymer containing 10 mol percent of 3-methylcatechol, the final polymer having an intrinsic viscosity in chloroform at 30° C. of 45 ml./g.

EXAMPLE 6

The reaction of Example 3 was again repeated, this time using 22.8 gm. of 2,6-dimethylphenol (0.19 mol.) and 2.1 gm. of 3-methylcatechol-1-pyranol ether (0.01 mol.). The yield in this case was 22.5 gm. of a polymer having 5 mol percent of 3-methylcatechol groups. The intrinsic viscosity of the final polymer was 45 ml./g. in chloroform at 30° C.

EXAMPLE 7

The reaction of Example 3 was again repeated, in this case using 24 gm. of 2,6-dimethylphenol (0.20 mol.) and 0.4 gm. of 3-methylcatechol-1-pyranol ether (0.002 mol.). This polymer containing 1 mol percent of 3-methylcatechol units was produced in an amount of 22 gm. and had an intrinsic viscosity in chlorform at 30° C. of 45 ml./g.

EXAMPLE 8

A control example was run using only 2,6-dimethylphenol and no 3-methylcatechol-1-pyranol ether. The steps of Example 3 were repeated using 24 gm. of 2,6-xylenol and the yield was 19.8 gm. of polyphenylene ether having an intrinsic viscosity in chloroform at 30° C. of 49 ml./g.

Each of the copolymers produced in Examples 3–7 and the homopolymer produced in Example 8 were capable of compression molding without additional catalysts. For example, when a portion of the material from each of these runs was compression molded at 255° C. and 1000 p.s.i. ram pressure to chips, the molded samples were transparent, varying from yellow to brown in color. Additionally, they were tough and flexible. However, small pieces of the compression molded material dissolved rapidly and completely when placed in chloroform. On the other hand, when cross-linking was provided in the polymer structure by blending the copolymers containing 3-methylcatechol units with hexamethylenetetramine and subsequently compression molding, insoluble polymers resulted. The hexamethylenetetramine treatment was, however, ineffective for the homopolymer of 2,6-dimethylphenol. The results of these cross-linked molded polymers are shown in the table below.

a majority of the methylcatechol units present are cross-linked. When a stoichiometric amount of hexamethylenetetramine is utilized, insufficient cross-linking is provided so that the copolymer essentially acts as a standard 2,6-dimethylphenol homopolymer which is not cross-linked. As a comparison, a portion of the copolymer formed in Example 4 was molded without any hexamethylenetetramine and was tested for crazing in the manner just described. This sample broke in a few seconds.

EXAMPLES 16–21

Chloroform solutions containing 10% of the various copolymers were prepared, and to part of the solutions 10% hexamethylenetetramine, based on the copolymer, was added. Copper strips having a width of ½ inch were claimed in dilute, aqueous nitric acid, washed with water and methanol, and immediately after drying, dipped halfway into the polymer solutions. The solvent was driven

TABLE I

| Example | Polymer Example Used | Mol Percent Methyl-catechol Units | Hexa-methylenetetramine added, percent by Weight | Percent Swelling in Chlorobenzene | Crazing |
|---|---|---|---|---|---|
| 9 | 4 | 20 | 25 | 7 | 0. |
| 10 | 5 | 10 | 13 | 31 | 0. |
| 11 | 5 | 10 | 3 | Not determined | 0. |
| 12 | 6 | 5 | 6.7 | 40 | 0. |
| 13 | 7 | 1 | 10 | Not determined | Slight. |
| 14 | 7 | 1 | 1.7 | Dissolves | Yes. |
| 15 | 8 | 0 | 25 | do | Yes. |

The percent swelling as tabulated in the table was determined by suspending a small sliver of the molded material under a microscope and measuring its dimensions. Subsequently, the material was suspended under the microscope in chlorobenzene and its dimensions again measured.

off in an oven at 75° C. for a period of ½ hour, and the strips were subsequently baked and cured for 15 minutes at 225° C. The coated strips were then suspended for 2 hours in boiling xylene. The results of this treatment are summarized in the table below.

TABLE II

| Example | Mol Percent 3-Methyl-catechol in Copolymer | Hexamethylene-tetramine Added | Effect of Boiling Xylene |
|---|---|---|---|
| 16 | 5 | Yes | Coating removed. |
| 17 | 5 | No | Do. |
| 18 | 10 | Yes | Coating appeared unchanged. |
| 19 | 10 | No | Coating removed. |
| 20 | 50 | Yes | Coating appeared unchanged. |
| 21 | 50 | No | Coating removed. |

The resistance to solvent crazing was determined with a ¼ inch wide strip, cut from the molded chip. The strip was bent slightly, and a drop of heptane was placed on the convex side of the bend. The material of Examples 14 and 15 immediately went limp and, in a few seconds, broke. The material of Example 13, having a hexamethylenetetramine content of almost 6 times that of Example 14, but otherwise the same material, did not break, but did show some surface cracking. The materials in the other examples were not visibly affected by the treatment.

The difference noted between Examples 13 and 14, each of which has 1% methylcatechol units, is evidence of the loss of hexamethylenetetramine due to evaporation during the heated cross-linking reaction. When only 1% of the cross-linkable units are present, an excess of hexamethylenetetramine is needed to insure that at least The strips having the coatings which appeared unchanged could be bent 180° around a rod having a ¼ inch radius, and the coating cut on the lower side of the bend in a diamond shape, without the coating peeling off.

While it has been noted that the polyphenylene ether resin may contain from 1 to 100 mol percent of the acetal ether containing protected hydroxyl groups, when a methylene bridge cross-linked polymer is to be produced following hydrolytic removal of acetal ether, a preferred range is from 10 to 20 mol percent. Though additional cross-linking, and thus additional assurance that the desired properties will be achieved, is provided by more than 20 mol percent of the acetal ether unit, the cost of these units is so high that the inclusion of more than 20 percent, except under special circumstances, is not justified. On the other hand, while 1% of the ether units will provide improved properties when the polymer is reacted with formaldehyde releasing compounds, full development of the properties is not achieved until the polymer consists of about 10% acetal ether units.

The polymers containing the phenolic hydroxyl units have a number of distinctive properties which increase their value over phenylene oxide polymers which do not contain the phenolic hydroxyl units. Among these are:

| | Polyphenylene Ethers Containing Phenolic Hydroxyl Units | Polyphenylene Ethers Without Phenolic Hydroxyl Units |
|---|---|---|
| 1 | May be coated from solution onto metal surfaces with excellent adhesion. | Peels from metal surfaces when applied from solvent solution, especially in the presence of water. |
| | Become tightly cross-linked and thus insoluble, when heated in the presence of an aldehyde-releasing agent, such as hexamethylenetetramine, paraformaldehyde, trioxymethylene, and other cross-linking agents commonly used with with phenolic resins. | Aldehyde-releasing agents do not cross-link, so that the polymer remains soluble in chlorinated and aromatic hydrocarbons. |
| 3 | The copolymers may be cross-linked through reactions involving the hydroxyl group itself. | Not applicable. |
| 4 | Form epoxy resins through the reaction of epichlorhydrin with the hydroxy radical. | Do. |
| 5 | Form a particularly valuable, curable, material by mixing with halogenated polyphenylene oxide ether containing methylene halide groups. | No reaction. |
| 6 | Polymer chains may be grafted onto the polyphenylene oxide ether backbone through the hydroxyl group. | Not applicable. |

At least 10% hexamethylenetetramine, based on the weight of methylcatechol units present in the copolymer, must be supplied to provide adequate cross-linking. This is the theoretical amount, and as noted with respect to the difference in performance between Examples 13 and 14, an excess of hexamethylenetetramine should be used to compensate for losses due to evaporation. As a certain amount of hexamethylenetetramine is lost, the effect is an incomplete utilization of the hydroxyl group-containing phenols for cross-linking. As the etheric phenol is relatively expensive, the use of less than an excess of hexamethylenetetramine is obviously uneconomical when viewed in light of the relatively low cost of this formaldehyde-releasing compound.

The curing of the cross-linked resin must be effected at a temperature of at least 150° C., and not higher than 300° C. A preferred curing temperature range is between 250–300° C. The time required for curing obviously varies inversely with the curing temperature utilized. In the preferred curing range the time varies from about 5 to 30 minutes.

In all previous examples the polyphenylene ether containing the 3-methylcatechol units, which are representative of the phenols containing hydroxyl groups, has been cross-linked using aldehyde-releasing substances, such as hexamethylenetetramine. As noted in Point 3 above, the copolymer may be linked through reactions involving the hydroxyl groups themselves. Such cross-linking involves reaction with di-acids, di-acid anhydrides, di-acid chlorides, carboxyl-terminated polyesters, carboxyl-terminated polyamides, di-isocyanates, phosgene, bischloroformates, especially polyethers, and polycarbonates, and dialkyl or diaryl carbonates.

With respect to the reaction of the phenolic polymer with epichlorhydrin, a continuous range of epoxide equivalents may be obtained in the final epoxy resin. For example, the epoxide equivalent may vary from 178 for the homopolymer of the hydroxylated phenol to 12,000 for the copolymer of the non-hydroxylated phenol containing 1% of hydroxylated phenol. Curing agents which may be employed to cure these epoxy resins are those which are commonly used in the epoxy resin technology.

The curable materials formed on reaction with halogenated polyphenylene oxide ethers, as described in Point 5 above, interact upon heating. This interaction results in the elimination of hydrohalides and the formation of ether bridges between the polymer chains.

Various reactions are included among those by which graft copolymers may be made. For example, reaction with ethylene oxide yields of polyether side chain. Reaction with di-acid chlorides or di-acid anhydrides, and di-functional alcohols, produces polyester and polycarbonate side chains. These are only exemplary of the possible monomers which may be reacted with the hydroxylated phenylene ether units. Additionally, polymeric molecules may be grafted onto the polyphenylene ether polymer by suitable means, such as, for example, phosgenation of a mixture of a hydroxylated polyphenylene ether copolymer and an excess of hydroxyl-terminated polycarbonate resin, polyethyleneglycol, etc. Further, the hydroxyl groups in the polyphenylene ether polymer may be alkylated with allylchloride, and the resulting product copolymerized with vinyl monomers to produce polyvinyl polymer side chains. These graft copolymers show improved properties, such as increased flexibility, because of their reduced ability to crystallize.

The copolymers of the etheric phenols and other substituted and unsubstituted phenols, as described above, are true thermoplastic materials and may be extruded, compression or transfer molded, solution cast, or shaped by any other method to form rods, tubing, pipe, strands, ribbons, sheets, film, or more intricate forms as may be desired. In addition, the copolymers may be coated onto substrates by extrusion, calendering, or deposition from solution in a volatile solvent, or from aqueous dispersions. Further, the materials may be utilized as such, or in combination with inert fillers, plasticizers, and other materials commonly employed with thermoplastic polymers.

The copolymers which have been cross-linked, as described above, preferably during the molding operation or a final curing period after the material is in its final shape, have superior tensile properties, especially at elevated temperatures, and superior solvent resistance, as compared to non-cross-linked materials.

The excellent adhesion of the copolymers to metal surfaces, combined with the ease of curing the copolymers, makes them especially attractive for use in coating compositions and varnishes. Particularly, in this respect, the copolymers are much superior to unmodified polyphenylene ethers, which have low solvent resistance, poor adhesion, and a resistance to the easy cure which would provide high temperature resistance.

While specific embodiments of the invention have been shown and described, the invention should not be limited to the particular formulations and methods of formation shown. It is intended, therefore, by the appended claims, to cover the additional modifications which have been made ardent as being within the spirit and scope of this invention.

What I claim as new and desire to secure by Letters Patent of the United States is:
1. A polyphenylene ether resin containing
   (a) from 1 to 100 mol percent first 3-methylcatechol-1-pyranol ether units of the formula

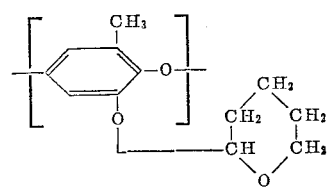

and (b) from 99 to 0 mol percent second ether units having the formula

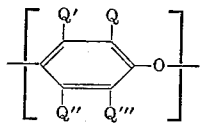

where Q is a monovalent substituent selected from the group consisting of hydrogen, hydrocarbon radicals free of a tertiary α-carbon atom, and halohydrocarbon radicals having at least two carbon atoms between the halogen atom and phenol nucleus and being free of a tertiary α-carbon atom; and Q' and Q'' are the same as Q and, in addition, halogen, hydrocarbonoxy radicals free of a tertiary α-carbon atom and halohydrocarbonoxy radicals having at least two carbon atoms between the halogen atom and phenol nucleus and being free of a tertiary α-carbon atom.

2. The resin of claim 1 where Q, Q', Q'' and Q''' are limited to non-ether substituents.

3. The resin of claim 1 where Q' and Q'' are hydrogen.

4. The resin of claim 1 where the second ether units are 2,6-dimethyl-1,4-phenylene ether units.

5. The resin of claim 4 where the 3-methylcatechol-1-pyranol ether units are contained in an amount of from 10 to 20 mol percent and the 2,6-dimethylphenyl ether units are in an amount of from 90 to 80 mol percent.

6. A crosslinked polyphenylene ether resin formed from an aldehyde precursor and a resin having
(a) from 1 to 100 mol percent of first polymer units having the formula

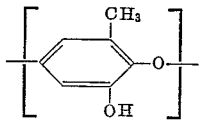

and
(b) from 99 to 0 mol percent of second polymer units having the formula

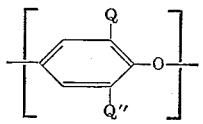

where Q is a monovalent substituent selected from the group consisting of hydrogen, hydrocarbon radicals free of tertiary α-carbon atom, and halohydrocarbon radicals having at least two carbon atoms between the halogen atom and phenol nucleus and being free of a tertiary α-carbon atom; and Q'' is the same as Q and in addition, halogen, hydrocarbonoxy radicals free of a tertiary α-carbon atom, and halohydrocarbonoxy radicals having at least two carbon atoms between the halogen atom and phenol nucleus and being free of a teriary α-carbon atom; crosslinking being through a plurality of alkylene bridges.

7. The crosslinked resin of claim 6 where Q and Q' are non-ether substituents.

8. The crosslinked resin of claim 6 where the first polymer units were originally present in an amount of from 10 to 20 mol percent and said second polymer units were present in an amount of from 90 to 80 mol percent.

9. The crosslinked resin of claim 6 where Q and Q'' are each methyl.

10. A process for forming a crosslinked polyphenylene ether resin comprising
(a) oxidatively polymerizing
(1) from 1 to 100 mol percent of a first compound having the formula

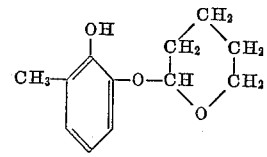

and
(2) from 99 to 0 mol percent of a second compound having the formula

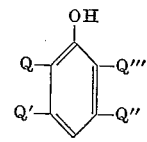

where Q is a monovalent substituent selected from the groups consisting of hydrogen, hydrocarbon radicals free of a tertiary α-carbon atom, and halohydrocarbon radicals having at least two carbon atoms between the halogen atom and phenol nucleus and being free of a tertiary α-carbon atom; and Q', Q'' and Q''' are the same as Q and, in addition, halogen, hydrocarbonoxy radicals being free of a tertiary α-carbon atom and halohydrocarbonoxy radicals having at least two carbon atoms between the halogen atom and phenol nucleus and being free of a tertiary α-carbon atom,
(b) hydrolyzing said polymer in the presence of an aqueous solution of a strong mineral acid to remove the ether constituents of said first polymer segments and form hydroxyl groups, and
(c) reacting said hydrolyzed polymer with at least 10% by weight, of an aldehyde releasing substance to form alkylene bonds.

11. The process of claim 10 wherein Q, Q' Q'' and Q''' are limited to non-ether substituents.

12. The process of claim 10 where Q and Q''' are methyl and Q' and Q'' are hydrogen.

13. The process of claim 10 where said first compound is present in an amount of from 10 to 20 mol percent and said second compound is present in an amount of from 90 to 80 mol percent.

No references cited.

WILLIAM H. SHORT, *Primary Examiner.*

M. GOLDSTEIN, *Assistant Examiner.*